INVENTOR.
CHARLES R. BISHOP
HIS EXECUTRIX
BY MURIEL J. BISHOP
BY Beehler & Arant
ATTORNEYS Nov. 12, 1968  C. R. BISHOP  3,410,571
FOUR-WHEEL STEERING TORSION-BAR
Filed July 11, 1966  3 Sheets-Sheet 2
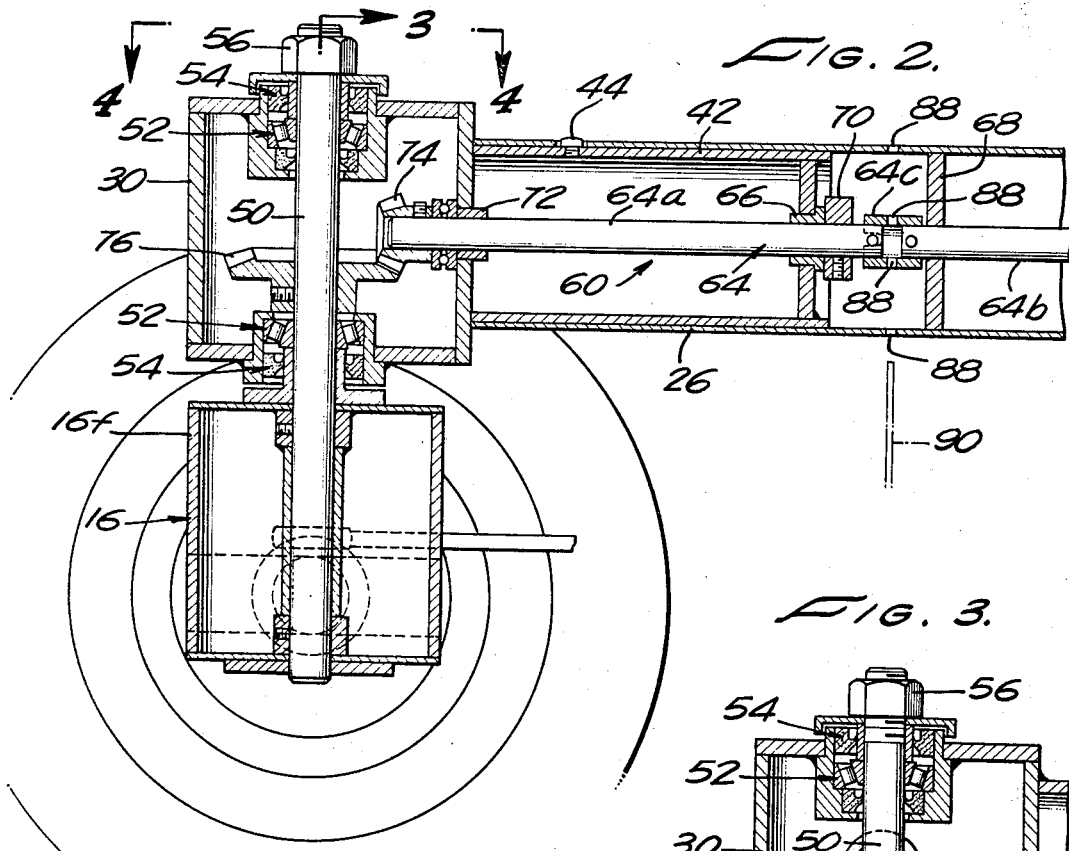
FIG. 2.
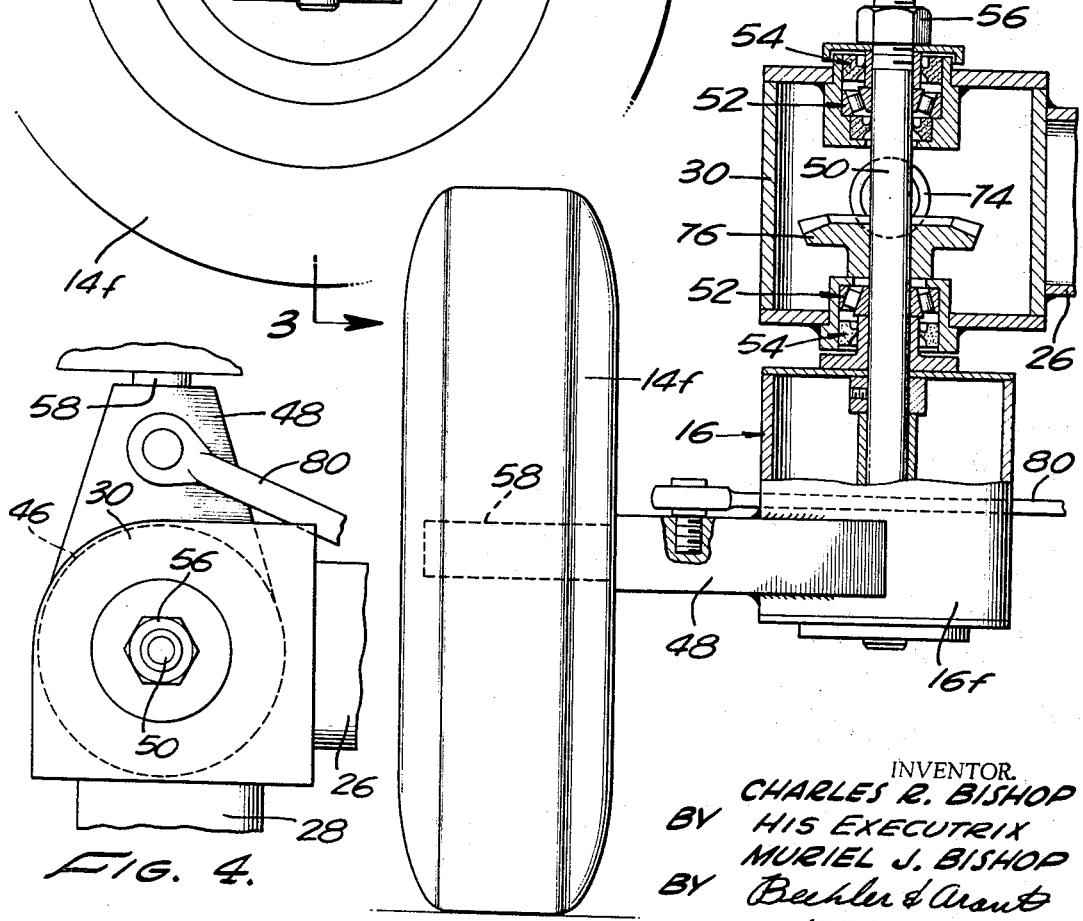
FIG. 3.
FIG. 4.
INVENTOR.
CHARLES R. BISHOP
BY HIS EXECUTRIX
MURIEL J. BISHOP
BY Bechler & Arantz
ATTORNEYS INVENTOR.
CHARLES R. BISHOP
BY HIS EXECUTRIX
MURIEL J. BISHOP
BY Beehler & Arant
ATTORNEYS

United States Patent Office

3,410,571
Patented Nov. 12, 1968

3,410,571
FOUR-WHEEL STEERING TORSION-BAR
Charles Richard Bishop, deceased, late of Garden Grove,
Calif., by Muriel Janet Bishop, executrix, 10342 Hill
Road, Garden Grove, Calif. 92640
Filed July 11, 1966, Ser. No. 565,056
10 Claims. (Cl. 280—99)

ABSTRACT OF THE DISCLOSURE

A wheeled vehicle is provided having a closed torque loop steering system connecting the vehicle wheels for unified steering movement of the wheels. The steering system embodies elastic means which are pre-stressed to maintain in the steering system a torsional stress or load for eliminating backlash. The vehicle is disclosed in connection with an articulated vehicle frame having tubular frame members which contain torque shafts of the steering system and are pivotally interconnected by corner members in such a way that the frame may twist freely without torsional stressing of the frame to permit the wheels to follow the ground contour.

This invention relates generally to wheeled vehicles and, more particularly, to a novel steering system for vehicles equipped with front and rear steerable wheels.

According to one of its broader aspects, the invention provides a vehicle having steerable front and rear wheels and a steering system including a unique pre-stressed closed loop torque train for driving the wheels in their angular steering movement. This steering system causes accurate unified positioning of the wheels in such a way as to permit precise steering control of the vehicle. The illustrative embodiment of the invention is a trailer having a pivoted hitch tongue which is adapted for connection to a towing vehicle and is operatively connected to the closed loop torque train of the trailer steering system in such a way that swinging of the tongue laterally of the trailer effects unified steering movement of the trailer wheels. In this embodiment, the front wheels and the rear wheels undergo unified steering movement in opposite directions. Accordingly, swinging movement of the hitch tongue in either direction, occasioned by turning of the towing vehicle, effects unified turning of the front trailer wheels in one direction and the rear wheels in the opposite direction, thus to cause the trailer to accurately track behind or follow the towing vehicle both during linear and arcuate movement of the vehicle.

A unique and highly important feature of the invention resides in the fact that the closed loop torque train of the present vehicle steering system embodies pre-stressed elastic means for maintaining a preset torsional stress in the train. This preset torsional stress effectively eliminates backlash in the steering system, thereby improving the accuracy of steering control. In the illustrative embodiment of the invention, for example, the closed loop torque train of the steering system embodies a pair of torsionally elastic torque shafts which extend along opposite longitudinal sides of the vehicle frame and interconnect the respective adjacent front and rear wheels for unified steering movement thereof in opposite directions. These torque shafts are torsionally stressed in opposite directions to maintain the preset torque in the closed loop torque train.

According to another of its aspects, the invention provides a vehicle with steerable front and rear wheels and having a steering system for effecting unified steering movement of the wheels. This steering system includes a pair of torque shafts which extend along two opposite sides of the vehicle frame and are operatively connected at their ends to the adjacent wheels in such a way as to cause unified steering movement of the adjacent wheels. The vehicle frame includes a pair of tubular frame members which extend along the latter frame sides and contain the torque shafts, whereby these shafts are enclosed and protected by the tubular frame members.

According to still further aspects of the invention, the vehicle frame has an articulated construction similar to that disclosed in co-pending application Ser. No. 418,-167, filed Dec. 14, 1964, and entitled "Torsion Free Articulated Vehicle Suspension." This articulated frame is composed of tubular side frame members, tubular end frame members, and corner members which are pivotally connected to the adjacent side and end frame members in such a way as to permit relative rotation of each frame member and its adjacent corner members about the longitudinal axis of the respective frame member. The pivotal connections between the frame members and corner members adapt the frame for articulation involving unified pivoting of the side members in opposite directions about a common central transverse pivot axis of the frames and simultaneous pivoting of the end members in opposite directions about a common central longitudinal pivot axis of the frame. Cooperatively associated with this articulated or flexible frame is a rigid frame, or rigid frame platform, which is pivotally connected to the side and end members, respectively, on the respective transverse and longitudinal pivot axes. The vehicle wheels are carried by wheel supports which are rotatably mounted on the corner members of the flexible frame for turning on normally generally vertical axes.

The arrangement of this vehicle suspension is such that each wheel is permitted to move vertically relative to the remaining wheels. Accordingly, during movement of the vehicle over rough or uneven terrain, the four vehicle wheels move up and down effectively independently of one another in accordance with the contour of the terrain. One advantage of the suspension resides in the fact that such independent vertical movement of the wheels occasions simple relative pivotal movement of the side and end members of the flexible frame relative to the rigid frame without imparting torsional or bending stresses to the rigid frame or to a payload supported thereon. An additional, highly important advantage of the suspension resides in the fact that the points of pivotal attachment of the flexible frame to the rigid frame are located approximately midway between the vehicle wheels. Accordingly, the loading of these wheels is substantially equalized at all times.

According to the aspect of the invention under discussion, the vehicle is equipped with a steering system including torque shafts which extend axially through the tubular side members of the flexible frame and interconnect the front and rear wheel supports along each side of the frame for unified steering movement or turning thereof about their respective rotation axes. The steering system further includes means which interconnect at least the two wheels at one end of the frame in such a way as to effect unified steering movement of all of the vehicle wheels and a steering member for turning the wheel supports in unison. This steering system may comprise a closed loop torque train of the character described earlier. In this case, the steering system is equipped with means for interconnecting the two front wheel supports and the two rear wheel supports and the torque shafts of the steering system are torsionally stressed in opposite directions in the manner mentioned earlier. This vehicle construction is unique in that the tubular side members enclose the longitudinal torque shafts in such a way as to protect and obscure these shafts without interfering with rotation of the shafts to effect steering movement of the wheels or relative rotation of the tubular members and corner members of the flexible frame during articulation of this frame.

Accordingly, it is a principal object of the present invention to provide a new and unique steering system for vehicles with steerable front and rear wheels.

Another object of the invention is to provide a vehicle steering system of the character described which embodies a novel closed loop torque train for driving the vehicle wheels in unison in their steering movement.

A related object of the invention is to provide a vehicle steering system of the character described wherein the closed loop torque train of the system includes prestressed elastic means for maintaining a preset torsional stress in the system to eliminate backlash and thereby permit more accurate steering control of the vehicle.

Yet another object of the invention is to provide a vehicle steering system of the character described wherein certain adjacent wheels are interconnected for unified steering movement thereof by torque transmission means, such as rotary torque shafts, which extend through tubular members of the vehicle frame in such a way that the torque transmission means are concealed and protected by the tubular frame members.

A further object of the invention is to provide a vehicle with a steering system of the character described and having an articulated torsion free frame construction like that disclosed in the aforementioned co-pending application Ser. No. 418,167, and wherein this frame construction includes pivoted tubular frame members which enclose, and thereby conceal and protect, certain torque transmission means of the steering system for transmitting steering torque between adjacent wheels of the vehicle.

Yet a further object of the invention is to provide a trailer to be towed behind a towing vehicle and having a novel steering system which is operated or controlled by swinging movement of a pivoted hitch tongue for connecting the trailer to the towing vehicle in such a way as to cause the trailer to accurately track or follow directly behind the towing vehicle.

A still further object of the invention is to provide a vehicle steering system of the character described which is relatively simple in construction, economical to manufacture, reliable in operation, rugged, and otherwise ideally suited to its intended purposes.

Other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:

FIGURE 2 is an enlarged section taken on line 2—2 in FIGURE 1;

FIGURE 3 is a section taken on line 3—3 in FIGURE 2;

FIGURE 4 is a section taken on line 4—4 in FIGURE 2;

Figure 1:
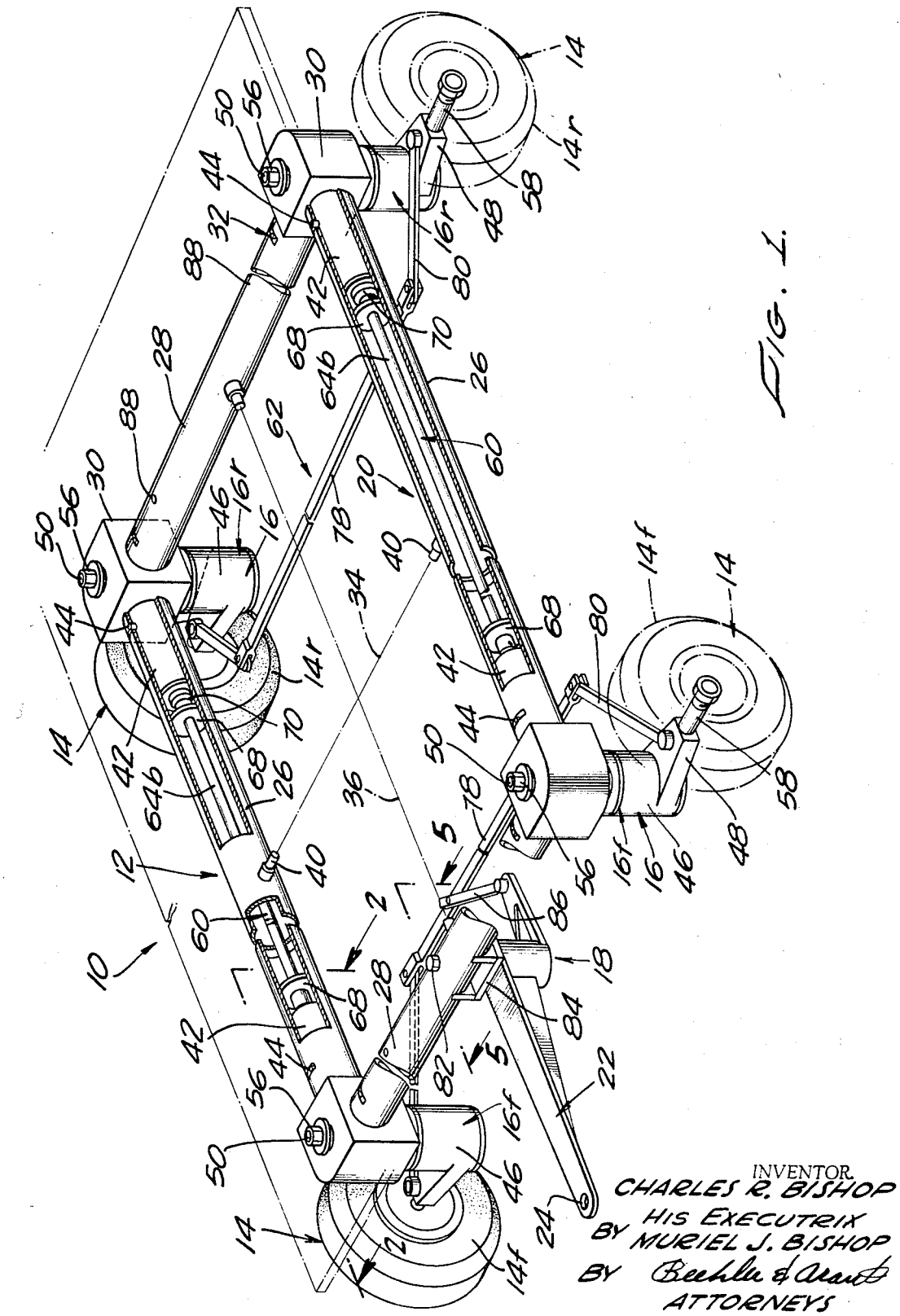
FIGURE 1 is a perspective view, partially broken away, of a vehicle or trailer embodying a four-wheel steering system according to the invention.
Figure 5:
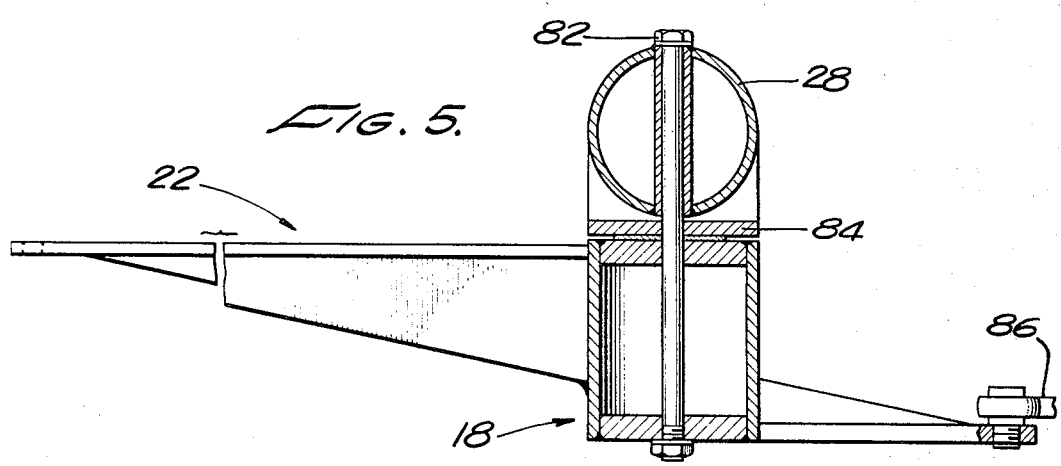
FIGURE 5 is a section taken on line 5—5 in FIGURE 1.

Referring first in general terms to these drawings, the vehicle 10 of the invention which has been selected for illustration therein comprises a rectangular frame 12 supported on four ground wheels 14 including a pair of front wheels 14f and a pair of rear wheels 14r. Wheels 14 are rotatably mounted on wheel supports 16 located at the four corners of the frame 12. Each wheel support, in turn, is rotatably mounted on its respective corner of the frame for turning on a normally generally vertical axis.

Figure 7:
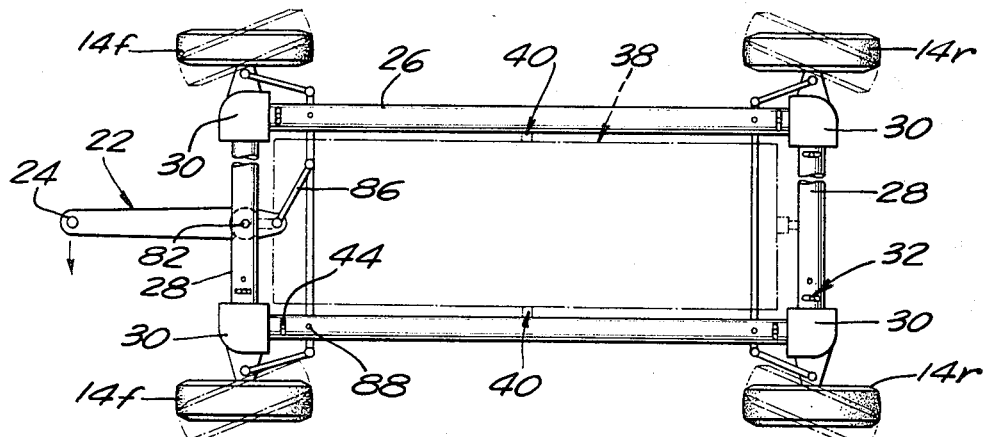
FIGURE 7 is a top plan view, on reduced scale, of the vehicle in FIGURE 1 illustrating the unified steering movement of the vehicle wheels.

Embodied in the vehicle 10 is a four-wheel steering mechanism 18 for the ground wheels 14. This steering mechanism includes a closed loop torque train 20 which operatively connects the four wheels 14 for unified steering movement thereof and a steering member 22 for selectively turning the wheels in their steering movement, thus to steer the vehicle 10. The particular vehicle 10 illustrated is a trailer which is adapted to be towed behind a towing vehicle (not shown). The steering member 22 comprises a hitch tongue which extends from the forward end of the vehicle frame 12 and has coupling means 24 at its front end for connection to the towing vehicle. The steering member or hitch tongue 22 is pivotally mounted on the vehicle frame 12 and operatively connected to the closed loop torque train 20 in such a way that lateral swinging movement of the tongue relative to the frame, occasioned by turning of the towing vehicle, is effective to caused unified steering movement of the vehicle wheels 14. As will appear presently, this unified steering movement of the wheels involves unified turning of the front wheel supports 16f in the same direction about their respective vertical axes and unified turning of the rear wheel supports 16r in the opposite direction about their respective vertical turning axes. Thus, swinging of the hitch tongue 22 in either direction, occasioned by turning of the towing vehicle, causes unified rotation of the front wheels 14f in one direction and unified rotation of the rear wheels 14r in the opposite direction, as illustrated in FIGURE 7, thus to cause the vehicle or trailer 10 to accurately track or follow behind the towing vehicle.

The frame 12 of the illustrated vehicle 10 has an articulated torsion free construction similar to that disclosed in the aforementioned co-pending application. Thus, the frame 12 includes tubular side members 26, tubular front and rear end members 28, and corner members 30 which are pivotally connected by means 32 to the adjacent side and end members in such a way as to permit relative rotation of each tubular member and the adjacent corner members about the longitudinal axis of the tubular member. The wheel supports 16 are rotatably mounted in the corner members 30. The steering member or hitch tongue 22 is pivotally mounted on the front frame member 28.

As mentioned earlier, and explained in detail in the aforementioned co-pending application, the construction of the frame 12, herein referred to as the articulated or flexible frame, is such as to accommodate articulation of the frame involving unified pivoting of the side members 26 in opposite directions about a common central transverse pivot axis 34 of the frame and unified pivoting of the end members 28 in opposite directions about a common central longitudinal pivot axis 36 of the frame. The frame structure of the illustrated vehicle is completed by a rigid rectangular frame or frame platform 38. This rigid frame is pivotally mounted on the flexible frame 12 by means of four pivot supports or connections 40. The two pivot connections 40 located at opposite longitudinal sides of the frames have their pivot axes aligned with the transverse axis 34 of the flexible frame. The two pivotal connections 40 at the ends of the frames have their pivot axes aligned with the longitudinal axis 36 of the flexible frame. As noted earlier and described in the aforementioned co-pending application, this frame construction permits vertical movement of each vehicle wheel 14 relative to the remaining wheels. Accordingly, during movement of the vehicle over rough or uneven terrain, the four wheels move up and down effectively independently of one another in accordance with the contour of the terrain encountered by each wheel. During such independent vertical movement of the vehicle wheels, the side and end members 26, 28 of the flexible frame 12 undergo relative pivotal movement with respect to one another and to the rigid frame 38 about the axes 34, 36 of the flexible frame. This articulation of the flexible frame occasioned by movement of the vehicle over rough or uneven terrain occurs without imparting any torsional or bending stresses to the rigid frame 38 or to a payload supported thereon. Moreover, since the pivotal connections 40 between the flexible and rigid frames are located approximately midway between the vehicle wheels 14, as may be readily observed in the drawings, the loading on the wheels is substantially equalized at all times.

Referring now in greater detail to the illustrated vehicle 10, the corner members 30 of the flexible frame 12 comprise hollow, generally block-shaped housings. Rigidly joined to two intersecting vertical side faces of each corner member 30 and extending in mutually perpendicular relation from the corner member are a pair of relatively short tubular arms 42. Each side member 26 and end member 28 of the flexible frame 12 comprises a relatively long tube, the ends of which slidably receive the tubular arms 42 of the adjacent corner members 30. The pivotal connecting means 32 comprise radial pins 44 which are fixed in the tubular arms 42 of the corner members and extend through circumferential slots in the adjacent tubular side and end members 26, 28 of the flexible frame, as shown best in FIGURE 2. It is evident at this point, therefore, that each side and end member and the adjacent corner members of the tubular frame are capable of relative rotation about the longitudinal axis of the respective tubular member.

The wheel supports 16 are substantially identical and each includes a lower vertical, generally hollow tubular body 46 from which radially extends a horizontal arm 48. Extending coaxially through and rigidly secured to the tubular body 46 of each wheel support is an axle 50. As shown best in FIGURE 2, the axle 50 extends a substantial distance above the upper end of the tubular wheel support body 46. This upper end of each wheel support axle 50 extends vertically through the adjacent corner member 30 of the flexible frame 12 and is rotatably supported in the corner member by combined radial and thrust bearing means 52. These bearing means embody seals 54 for preventing the entrance of dirt and moisture into the bearings proper as well as into the interior chambers of the corner members. As may be best observed in FIGURE 2, the upper end of each wheel support axle 50 projects a short distance about its respective corner member and is threaded to receive a nut 56 for restraining the corresponding wheel support 16 against downward axial movement relative to the adjacent corner member 30. Extending from the outer ends of the horizontal arms 48 on the wheel supports 16 are rigid axles 58 on which the wheels 14 are rotatably mounted, as shown. The closed loop torque train 20 for driving the vehicle wheels 14 in unison in their steering movement comprises a pair of side torque transmission means 60 and a pair of front and rear torque transmission means 62. The side torque transmission means 60 extend along the sides of the vehicle frame 12 and each interconnects the adjacent front wheel support 16f and rear wheel support 16r for unified rotation thereof about the respective vertical turning axes. The front and rear torque transmission means 62 extend across the front and rear ends, respectively, of the frame 12 and each interconnects the two front wheel supports 16f or the two rear wheel supports 16r, as the case may be, for unified rotation about their respective vertical turning axes. As noted earlier, and explained below, each side torque transmission means 60 interconnects its adjacent front and rear wheel supports in such a way as to cause unified rotation thereof in opposite directions about their turning axes. Each front and rear torque transmission means 62 interconnects its adjacent wheel supports in such a way as to cause unified rotation thereof in the same direction about their respective turning axes. As shown best in FIGURE 1, the side torque transmission means 60 extend through the tubular side members 26 of the vehicle frame 12. These tubular frame members, then, conceal and protect the side torque transmission means.

Each side torque transmission means 60 comprises a torque shaft 64 which is rotatably supported in bearings 66 mounted within its respective enclosing tubular frame member 26. Preferably, each torque shaft 64 is composed of two end sections 64a, an intermediate section 64b, and intervening couplings 64c between the end sections and the intermediate section. These couplings are constructed, as shown, to restrain the shaft sections against relative rotation while permitting axial separation of the sections. As may be best observed in FIGURE 2, the couplings 64c of each torque shaft are located just beyond the outer ends of the tubular arms 42 on the frame corner members 30. The bearings 66 are fixed in the outer ends of these arms. Fixed within the tubular side frame members 26 of the frame 12, just inwardly of the shaft couplings 64c, are transverse walls 68. Fixed to each shaft end section 64a between the adjacent shaft coupling 64c and shaft bearing 66, is a collar 70. The shaft couplings 64c, walls 68, and collars 70 serve a function to be explained presently.

The front and rear ends of each torque shaft 64, that is the outer ends of the outer torque shaft sections 64a, extend through the walls of the frame corner members 30 into the interior chambers of these members and are supported in the latter walls by bearings 72. Fixed on these ends of each torque shaft are bevel gears 74. Each shaft gear 74 meshes with a bevel gear 76 which is fixed to the adjacent wheel support axle 50 within the corresponding frame corner member 30. It is evident at this point, therefore, that the two wheel supports 16f and 16r along each side of the vehicle frame 12 are interconnected by the intervening torque shaft 64 for unified rotation of these wheel supports in opposite directions about the vertical axes of their respective axles 50.

Each of the front and rear torque transmission means 62 comprise a bar 78 which extends across the corresponding end of the vehicle frame 12, just inwardly of the adjacent tubular end frame member 28. The ends of each bar 78 are pivotally connected by links 80 to the arms 48 of the adjacent wheel supports 46. It is evident at this point, therefore, that each of the end torque transmission means 62 interconnect the adjacent front or rear wheel supports 16, as the case may be, for unified rotation thereof in the same direction about the axes of their respective axles 50.

The steering member or hitch tongue 22 comprises an elongate arm-like structure which is pivotally supported, intermediate its ends, on the front tubular member 28 of the vehicle frame 12 by means of a hinge pin 82. The tongue will be observed to extend below the front frame member 28. Welded to the underside of this frame member is a bearing bracket 84, the underside of which provides a flat bearing surface for the tongue parallel to the plane of the frame 12. The rear end of the hitch tongue 22 is pivotally connected, by a link 86, to the bar 78 of the front torque transmission means 62. It is evident that the steering member or hitch tongue 22 is swingable laterally of the vehicle frame 12 and that such swinging movement of the tongue drives the adjacent bar 78 in the endwise direction.

It is now obvious that the side torque transmission means 60 and the end torque transmission means 62 of the vehicle steering mechanism 18 defines a closed loop torque train which is driveably coupled to the wheel supports 16 in such a way as to effect unified rotation of all four wheel supports on their respective vertical turning axes, thus to cause unified steering movement of the vehicle wheels 14. This unified steering movement of the wheels involves simultaneous turning of the front wheels 14f in one direction and the rear wheels 14r in the opposite direction, as indicated in FIGURE 7. It is further evident that swinging movement of the steering member or hitch tongue 22 laterally of the vehicle frame 12 causes such unified steering movement of the wheels. Thus, swinging of the hitch tongue in the counterclockwise direction, as viewed in FIGURE 7, results in counterclockwise turning of the front wheels and clockwise turning of the rear wheels, as shown. Similarly, clockwise swinging of the tongue occasions clockwise turning of the front wheels and counterclockwise turning of the rear wheels. The steering mechanism 18 is assembled in such a way that rotation of the hitch tongue 22 to a neutral position of alignment with the fore and aft centerline of the vehicle frame 12 simultaneously positions all of the vehicle wheels 14 in neutral positions wherein the rotation axes of all of the wheels are parallel and normal to the frame centerline.

It will be observed that the tubular side members 26 of the vehicle frame 12 do not in any way interfere with the rotation of the torque shafts 64 which occurs during steering movement of the vehicle wheels. Similarly, the steering mechanism 18, including the torque shaft, does not in any way interfere with the relative pivotal movements of the frame members 26, 28 occasioned by articulation of the flexible frame 12, in the manner explained earlier, during movement of the vehicle over rough or uneven terrain. This, of course, results from the fact that the torque shafts 64 extend along the axes of the relative rotation which occurs between the side frame members 26 and the corner members 30. Accordingly, the present steering mechanism 18 and the illustrated articulated frame construction are ideally and uniquely adapted for use with one another. It is obvious, however, that the present steering mechanism may be used with a rigid frame structure, if desired. In this case, the torque shafts 64 of the steering mechanism need not extend through members of the frame, as they do in the illustrated vehicle.

According to a further and highly important feature of the invention, the closed loop torque train 20 of the steering mechanism 18 is pre-stressed to eliminate backlash in the train, particularly between the meshing gears 74, 76. To this end, the torque train is equipped with elastic means which are stressed in such a way as to create the preset torque in the train. In the illustrated vehicle, these elastic means comprise the torque shafts 64. Thus, the diameter of the central shaft sections 64b are such that these sections possess a degree of torsional elasticity. When the vehicle is assembled, these shafts are torsionally stressed in opposite directions, thus to introduce into the torque train 20 a preset torsional stress for eliminating backlash.

In this regard, it is significant to recall that the torque shaft couplings 64c permit axial separation of the end sections 64a and the center section 64b of each torque shaft. When initially assembling the vehicle, the pins 44 are removed from the tubular arms 42 of the frame corner members 30 and these corner members and their respective intervening tubular end members 28 are assembled in the manner shown, thus to form two end frame assemblies. The tubular side frame members 26 are then axially positioned over the longitudinal tubular arms 42 on the corner members 30 of one end frame assembly. It is significant to note here that the end sections 64a of the torque shafts 64 are carried by the corner members 30 while the center shaft sections 64b are carried by the tubular side frame members 26. The shaft couplings 64c permit the end shaft sections 64a carried by the end frame assembly, just mentioned, to be axially engaged with the adjacent ends of the center shaft sections 64b in the tubular side frame members 26 during assembly of these latter members and the end frame assembly, in the manner just explained. The shaft couplings 64c, bearings 66, tubular frame member walls 68, and shaft collars 70 serve to restrain the shaft sections against axial movement in their respective tubular members during this axial engagement of the shaft sections. The assembled frame members are then locked together by inserting the pins 44 into their respective tubular arms 42 of the frame corner members 30, thus to form a partial frame assembly including the two side frame members 26, one end frame member 28, the intervening corner members 30, and the elements of the torque train 20 carried by these frame members.

Figure 6:
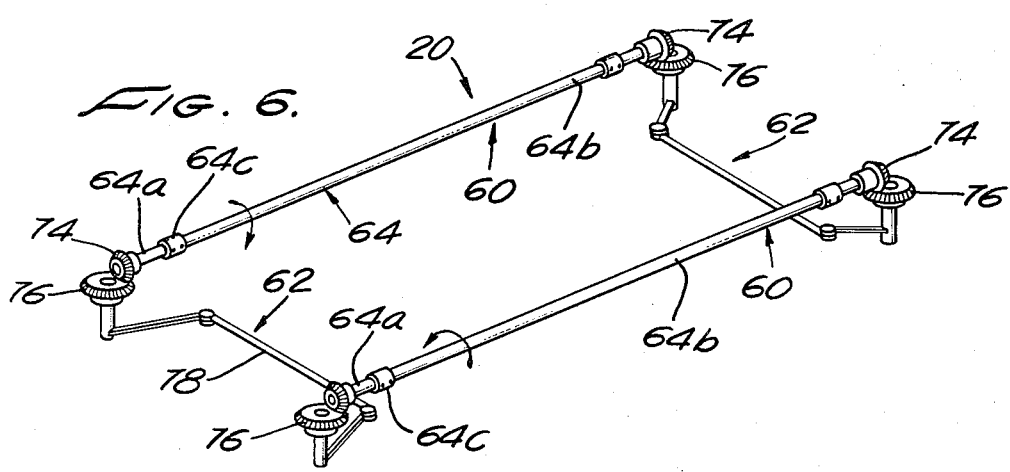
FIGURE 6 is a perspective view of the closed loop torque train embodied in the four-wheel steering system of the vehicle.

Prior to joining of this partial frame assembly with the other end frame assembly, the center torque shaft sections 64b are torsionally stressed. This is accomplished by first locking the wheel supports 16 carried on the partial frame assembly in their neutral positions. Thereafter, the ends of the center torque shaft sections 64b which are exposed through the currently open ends of the tubular frame members 26 are twisted in opposite directions, as indicated by the arrows in FIGURE 6, to stress these shaft sections in torsion. The center shaft sections are then locked in their twisted condition, after which the wheel supports 16 on the remaining end frame assembly are locked in their neutral positions and this end frame assembly and the partial frame assembly are joined in such a way that the end torque shaft sections 64a carried by the latter end frame assembly engage the couplings 64c on the center torque shaft sections 64b. These assemblies are then locked together by inserting the remaining coupling pins 44. To permit locking of the center torque shaft sections 64b in their twisted condition during joining of the partial frame assembly and the remaining end frame assembly, in the manner just explained, the tubular side frame members 26 and the torque shaft coupling 64c are provided with holes 88 for receiving cross pins 90. These cross pins are withdrawn after assembly of the vehicle has been completed. The holes 88 in the tubular side members and the shaft couplings, and the couplings themselves, are orientated in such a way that the holes are aligned to receive the cross pins 90 and the couplings are disposed to receive the torque shaft end section 64a on the remaining end frame assembly when the center shaft sections have been twisted the proper amount.

It is obvious that the preset torsional stress which is introduced into the torque train 20 of the steering mechanism 18 by twisting of the center torque shaft section 64b, in the manner just explained, is effective to eliminate backlash in the steering mechanism. However, this preset torsional stress is an internal stress within the closed torque train 20 and produces no unbalanced torque externally of the torque train. Accordingly, the preset torsional stress does not interfere with steering movement of the vehicle wheels 14 nor does it tend to urge the wheels in one direction.

While the invention has herein been shown and described in what is conceived to be the most practical and preferred embodiment, it is recognized that departures may be made therefrom within the scope of the invention, which is to be accorded the full scope of the claims so as to embrace any and all equivalent devices.

Having described the invention, what is claimed as new in support of Letters Patent is:

1. A vehicle comprising:
    a frame having front and rear ends,
    a pair of front wheel supports at opposite sides of the front end of said frame,
    a pair of rear wheel supports at opposite sides of the rear end of said frame,
    means rotatably mounting each wheel support on said frame for turning on a normally generally vertical axis,
    ground wheels rotatably mounted on said wheel supports, respectively, to support said vehicle for movement along the ground,
    torque transmission means on said frame defining a closed loop torque train interconnecting said wheel supports for unified rotation thereof on their respective turning axes,
    said torque transmission means including pre-stressed elastic means for maintaining a preset torsional stress in said closed torque train, thus to eliminate backlash in said torque train, and steering means connected to said torque train for turning said wheel supports in unison to steer said vehicle.

2. A vehicle according to claim 1 wherein:

said elastic means comprise torsionally stressed elastic torque shaft means extending between and interconnecting adjacent wheel supports of said vehicle.

3. A vehicle according to claim 1 wherein:

said torque transmission means comprise a pair of torsionally elastic torque shafts extending between and interconnecting adjacent wheel supports of said vehicle, and said torque shafts comprising said elastic means.

4. A vehicle according to claim 1 wherein:

said torque transmission means interconnect said wheel supports in such a way as to cause unified rotation of the two wheel supports along each side of said frame in opposite directions on their respective turning axes and unified rotation of the two front wheel supports and the two rear wheel supports in the same direction on their respective turning axes.

5. A vehicle according to claim 1 wherein:

said torque transmission means comprise a pair of torsionally elastic torque shafts extending along opposite longitudinal sides of said frame and means connecting each torque shaft and its respective adjacent front and rear wheel supports for unified rotation of said adjacent wheel supports, and said torque shafts comprising said elastic means.

6. A vehicle according to claim 1 wherein:

said torque transmission means are connected to said wheel supports in such a way as to cause unified rotation of the two wheel supports along each side of said frame in opposite directions on their respective turning axes and unified rotation of the two front wheel supports and the two rear wheel supports in the same direction on their respective turning axes, said torque transmission means comprise a bar extending transversely of the front end of said frame and means connecting the ends of said bar and said front wheel supports for unified rotation thereof in the same direction on their respective turning axes in response to endwise movement of said bar, and said steering means comprises a hitch tongue extending forwardly from the front end of said frame and pivotally mounted intermediate its ends on said front frame end for swinging laterally of said frame and means pivotally connecting the rear end of said tongue to said bar for causing endwise movement of said bar in response to lateral swinging of said tongue.

7. A vehicle comprising:

a frame having front and rear ends and including tubular side members, front and rear end members, corner members, and means releasably joining said side members to their respective adjacent corner members in such a way as to permit axial separation of said corner members and their respective intervening side members, a pair of front wheel supports rotatably mounted on the front corner members, respectively, for turning of said wheel supports on normally generally vertical axes, a pair of rear wheel supports rotatably mounted on the rear corner members for turning of said rear wheel supports on normally generally vertical axes, ground wheels rotatably mounted on said wheel supports, respectively, to support said vehicle for movement along the ground, a closed loop torque train interconnecting said wheel supports for unified rotation of said wheel supports on their respective turning axes including side torque shafts extending through said tubular side frame members, means connecting each side torque shaft to the respective adjacent front and rear wheel supports for unified rotation of said adjacent wheel supports in opposite directions on their respective turning axes, front and rear end torque transmission means extending across the front and rear ends, respectively, of said frame, and means connecting each end torque transmission means to the adjacent wheel supports for unified rotation of the latter adjacent wheel supports in the same direction on their respective turning axes, each said side torque shaft comprising axially separable sections including end sections carried by said corner members, respectively, and center sections carried by said tubular side members, respectively, and steering means operatively connected to said torque train for turning said wheel supports in unison to steer said vehicle.

8. A vehicle comprising:

a frame having front and rear ends and including tubular side members, front and rear end members, and corner members joining the adjacent side and end members, a pair of front wheel supports rotatably mounted on the front corner members, respectively, for turning of said wheel supports on normally generally vertical axes, a pair of rear wheel supports rotatably mounted on the near corner members for turning of said rear wheel supports on normally generally vertical axes, grounds wheels rotatably mounted on said wheel supports, respectively, to support said vehicle for movement along the ground, a closed loop torque train interconnecting said wheel supports for unified rotation of said wheel supports on their respective turning axes including torsionally elastic side torque shafts extending axially through said tubular side frame members, respectively, means connecting each side torque shaft to the respective adjacent front and rear wheel supports for unified rotation of said adjacent wheel supports in opposite directions on their respective turning axes, front and rear end torque transmission means extending across the front and rear end, respectively, of said frame, and means connecting each end torque transmission means to the adjacent wheel supports for unified rotation of the latter adjacent wheel supports in the same direction on their respective turning axes, said side torque shafts being torsionally twisted in opposite directions to create a pre-set torsional stress in said closed torque train, and steering means operatively connected to said torque train for turning said wheel supports in unison to steer said vehicle.

9. A vehicle according to claim 8 wherein:

means releasably joining said corner members and their respective intervening tubular side members, said torque shafts comprising axially separable sections including end sections carried by said corner members, respectively, and center sections carried by said tubular side members, respectively, said center shaft sections being torsionally elastic and including means at one end which are exposed to permit twisting of said center shaft sections to create said preset torsional stress prior to joining of the adjacent corner members and said tubular side members, and means for releasably locking said center shaft sections in their twisted condition.

10. A vehicle comprising:
- a frame having front and rear ends and including tubular side frame members, front and rear end members, corner members, and means pivotally connecting said corner members to the adacent side and end frame members in such a way as to permit relative rotation of each pair of adacent corner members and the intervening frame member about the longitudinal axis of the intervening member, thus to adapt said frame for articulation involving simultaneous pivoting of said side frame members in opposite directions about a central transverse pivot axis of said frame and simultaneous pivoting of said end frame members in opposite directions about a common central longitudinal pivot axis of said frame,
- a rigid frame cooperatively associated with said first mentioned articulated frame,
- means pivotally connecting said frames on said pivot axes,
- a pair of front wheel supports rotatably mounted on said front corner members, respectively, of said articulated frame for turning of said wheel supports on normally generally vertical axes,
- a pair of rear wheel supports rotatably mounted on the rear corner members, respectively, of said articulated frame for turning of said rear wheel supports on normally generally vertical axes,
- ground wheels rotatably mounted on said wheel supports, respectively, to support said vehicle for movement along the ground,
- a closed loop torque train interconnecting said wheel supports for unified rotation of said wheel supports on their respective turning axes including side torque transmission means extending through said tubular side frame members of said articulated frame, means connecting each side torque transmission means to their respective adjacent front and rear wheel supports for unified rotation of said adjacent wheel supports in opposite directions on their respective turning axes, front and rear end torque transmission means extending across the front and rear ends, respectively, of said frame, and means connecting each end torque transmission means to the adjacent wheel supports for unified rotation of the latter adjacent wheel supports in the same direction on their respective turning axes, and
- steering means operatively connected to said torque train for turning said wheel supports in unison to steer said vehicle.

References Cited

UNITED STATES PATENTS

| | | | |
|---|---|---|---|
| 2,763,493 | 9/1956 | Hutchinson | 280—99 |
| 2,994,392 | 8/1961 | Kosman | 280—91 |
| 3,197,229 | 7/1965 | Houlton | 280—91 |
| 3,241,630 | 3/1966 | Snabes et al. | 180—79.2 |

FOREIGN PATENTS 217,997  6/1924  Great Britain.

BENJAMIN HERSH, *Primary Examiner.*

L. D. MORRIS, JR., *Assistant Examiner.*